May 15, 1956  R. W. REID  2,745,774
METHOD OF MAKING CONDUCTIVELY COATED ELECTRODES
Filed May 23, 1955
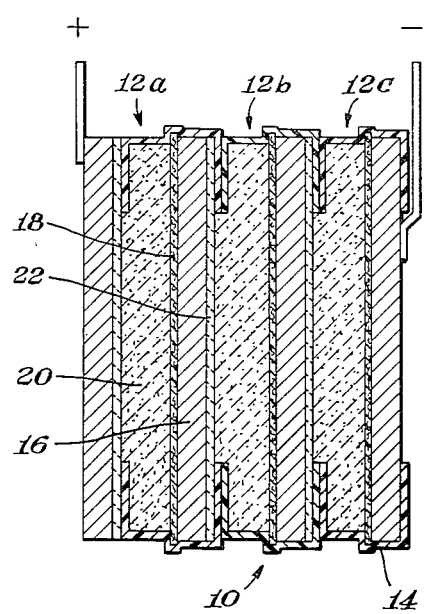
INVENTOR
Raymond W. Reid
BY
Griswold & Burdick
ATTORNEYS

United States Patent Office 2,745,774
Patented May 15, 1956

2,745,774

METHOD OF MAKING CONDUCTIVELY COATED ELECTRODES

Raymond W. Reid, Sanford, Mich., assignor to The Dow Chemical Company, Midland, Mich., a corporation of Delaware Application May 23, 1955, Serial No. 510,443

4 Claims. (Cl. 117—216)

This is a continuation in part of co-pending application Serial No. 440,396, filed June 30, 1954, now abandoned.

This invention relates to a method of providing an electrically conductive liquid impervious coating on metal surfaces, and particularly to such coatings on magnesium electrodes for use in batteries.

In so-called stacked cell batteries the anode of one cell is in juxtaposition with the cathode contact of the next adjacent cell and makes electrical contact therewith. Such battery structures are compact, efficient, and economical to make.

The success of the cell stacking arrangement depends on proper chemical isolation of the anode of each cell from the electrolyte of the next adjacent cell, for if the anode of one cell is exposed to the electrolyte from another cell, that surface of the anode which is exposed to the electrolyte from the adjacent cell will corrode. The corrosion increases the internal resistance of the battery. In addition, a back E. M. F., due to the formation of an unwanted "cell" between the exposed anode surface and adjacent cathode contact further reduces the output potential of the battery.

Several approaches have been made to the problem of isolating the cell anode from the electrolyte of adjacent cells. The surest solution is to provide physically separate cell structures which are connected together by wire, but this solution is both costly and results in a bulky battery structure.

Some attempts have been made to coat the exposed side of the anode with a conductive paint, but the application time is too long for economical commercial production, or the coating is not impervious when the paint dries.

Another approach to the above problem has been to apply a conductive cement and a liquid-tight conductive cloth to the exposed anode surface. This arrangement, resulted in a high resistance between cells when the technique was applied to magnesium anode cells.

Other conductive coatings, some of which were successful in zinc anode cells, either failed to protect magnesium anodes from corrosion due to exposure to the electrolyte from adjacent cells or were prohibitively expensive to make or apply.

Accordingly, a principal object of this invention is to provide an improved method of protecting metal electrodes from corrosion.

Another object is to provide an improved, more economical method of applying an electrically conductive coating to a magnesium anode.

An ancillary object of this invention is to provide an improved, directly connected magnesium anode-cathode contact electrode for use in stacked cell batteries.

In accordance with the invention, the conductive coating is applied to a surface of a metal electrode by rubbing the metal surface with carbon, coating the rubbed surface with molten tar, adding carbon particles to said coating, heating said coating at least to the melting point of said tar to disperse said particles through the coating, applying a wax having a lower melting point than tar to said coating, melting said wax, rubbing off the excess wax on the surface of said coating.

When the above method is applied to the coating of magnesium battery anodes, the side of the anode which is coated is utilized as the cathode contact for an adjacent battery cell and provides a liquid tight, electrically conductive coating which electrically connects but chemically isolates two adjacent cells one from another.

The invention, as well as additional objects and advantages thereof, will best be understood when the following detailed description is read in connection with the accompanying drawing, in which the single figure is a diagrammatic sectional view of a flat pack battery utilizing conductively coated electrodes in accordance with this invention.

In the drawing, there is shown a flat cell battery 10 in which the individual cells 12a, 12b, and 12c are stacked in juxtaposition one with another. Each cell is contained in a plastic case 14 and comprises a magnesium anode 16, a paper separator 18 disposed against one side of the magnesium anode 16, the cathode mix 20, and the cathode contact 22 which is bonded to the surface of the anode 16 of the next adjacent cell. The cathode mix may comprise a mixture of manganese dioxide and acetylene black plus a suitable electrolyte such as magnesium bromide, for example.

The cathode contact 22 comprises a coating which is a mixture of tar and graphite particles. The graphite is added to the tar after the tar is applied to the magnesium anode surface, as will be explained in detail later. Such a coating is impervious to liquid, has good electrical conductivity, forms a uniformly thick coating on the magnesium plate, adheres tightly to the magnesium, and will withstand abusive handling during assembly of the cells. Further, large sheets of magnesium may be dip coated and then cut to smaller anode sizes without adversely affecting the bonding between the magnesium and the coating.

A suitable manner of applying the coating to a magnesium electrode is as follows:

First, the magnesium surface is weak bright pickled in a solution of chromic acid, sodium nitrate and calcium or magnesium fluoride in water. Alternatively, the surface of the metal to be coated may be cleaned by wire brushing, but weak bright pickling is preferred. Also, pickled magnesium sheets may be stored prior to the application of the coating whereas surfaces which have been cleaned by wire brushing must be coated immediately to prevent the formation of a hydroxide coating having high electrical resistance.

A suitable solution for pickling magnesium comprises 24 ounces of chromic acid, 4 ounces of sodium nitrate, ⅛ ounce of magnesium fluoride and water to make each gallon of the pickling solution. The metal is immersed in the bath, which is at room temperature, for a period of 15 seconds to 5 minutes and is then rinsed with water.

Secondly, the surface to be coated is abraded with graphite or carbon. This step serves to further clean the surface of any films and makes an intimate bond between the graphite or carbon and the metal surface. It has been found that when this step is eliminated, the coating resistance increased substantially. Thus, for many electrode uses this step must be included in the method of applying the conductive coating.

Third, molten tar is applied to the surface to be coated. Tars derived from petroleum have been successfully used. Low melting point tars (melting point 190°–200° F.) are practical for use in the invention, but must be carefully handled to avoid scuffing of the coating and baring of the metal surface to which the coating is applied. Petroleum tars having melting points of 220°–235° F., so-called high melting point tars are preferable for all round usage in the invention. Asphalt tar having a melting point of 150°–180° F. may also be used. The metal surface being coated is either preheated to the temperature of the molten coating material or it is retained in contact with the molten mixture until it reaches the temperature of the molten tar before being removed from the tar. The coated surface is then cooled to solidify the tar.

Following this, finely divided particles of carbon, such as battery grade graphite, for example, are applied or sprinkled over the tar surface and the tar is heated at least to its melting point to disperse the particles therethrough. The surface is again cooled to solidify the tar.

Then micro-crystalline wax or other wax having a melting point lower than that of tar is applied to the coated surface. The surface is heated to melt the micro-crystalline wax and then the excess wax is rubbed off. The low melting point wax seals any pores in the tar surface, making the coating more impervious to liquids. While the tar is not entirely liquid impervious, its tenacity in clinging to the metal surface, and especially to magnesium surfaces, under mechanical abuse makes it a desirable base material for a conductive coating.

To further increase the conductivity of the coating, additional particles of graphite or carbon particles are sprinkled over the coating, and the coating is heated at least to the melting point of the tar to disperse the particles through the coating.

The steps of rubbing the surface with carbon and dispersing additional carbon through the coating may be dispensed with if low resistance coatings are not required.

Using the above described method, coating resistances of the order of 0.1 ohm per sq. inch have been obtained. Further, the resistance through the coating remained low after storage or after a cell was discharged.

In one cell which was successfully tested in which a conductive coating mixture in accordance with this invention was used, the cathode mixture consisted of, by weight, 91% MnO₂, 3% BaCrO₄, and 6% acetylene black wetted with 300 cc. of 250 g./l. MgBr₂+0.2 g./l. Na₂CrO₄ electrolyte per 1000 grams of dry depolarizer mix. None of the electrolyte penetrated the tar-graphite coating.

Thus, this invention provides an improved method of coating a magnesium surface with a liquid impervious, electrically conductive film which is economical to make and to apply to the surface.

A coating applied in accordance with this invention adheres tightly to the magnesium, withstands bending and shearing well, and has low resistivity. The method of this invention will likewise find use in the coating of copper, zinc, steel and other metals in which a tightly adherent electrically conductive liquid impervious film may be desired. Although battery grade graphite particles have been mentioned as the conductive material dispersed in the tar, other finely divided particles of carbon may be used.

I claim:

1. The method of applying an electrically conductive, liquid impervious coating to a clean metal surface, comprising applying a coating of molten petroleum derived tar having a melting point between 150° F. and 235° F., to the surface to be coated, cooling said coated surface to solidify the tar, applying finely divided carbon particles to said coated surface, heating said coating at least to the melting point of said tar to disperse said particles through said tar, cooling the coated surface to below the melting point of said tar, spreading a wax having a lower melting point than that of tar over said coated surface, heating said surface to melt said wax, and rubbing off the excess wax from said coated surface.

2. The method of applying an electrically conductive, liquid impervious coating to a clean metal surface, comprising rubbing said clean metal surface with carbon, applying a coating of molten petroleum derived asphaltic tar to the surface to be coated, said tar having a melting point between 150° F. and 180° F., cooling said coated surface to solidify the tar, applying finely divided carbon particles to said coated surface, heating said coating at least to the melting point of said tar to disperse said particles through said tar, cooling the coated surface to below the melting point of said tar, spreading a wax having a lower melting point than that of tar over said coated surface, heating said surface to melt said wax, and rubbing off the excess wax from said coated surface.

3. The method of applying an electrically conductive, liquid impervious coating to a clean metal surface, comprising rubbing the clean metal surface with carbon, applying a coating of molten petroleum derived tar to the surface to be coated, said tar having a melting point between 190° F. and 235° F., cooling said coated surface to solidify the tar, applying finely divided carbon particles to said coated surface, heating said coating at least to the melting point of said tar to disperse said particles through said tar, cooling the coated surface to below the melting point of said tar, spreading a wax having a lower melting point than that of tar over said coated surface, heating said surface to melt said wax, rubbing off the excess wax from said coated surface, adding additional carbon particles to said surface, and heating said surface to disperse said addition particles through said coating.

4. The method of applying an electrically conductive, liquid impervious coating to a magnesium surface, comprising weak bright pickling the surface to be coated, rubbing the pickled surface with graphite, applying a coating of molten petroleum derived tar to the surface to be coated, said tar having a melting point between 220° F. and 235° F., cooling said coated surface to solidify the tar, applying particles or battery grade graphite to said coated surface, heating said coating at least to the melting point of said tar to disperse said particles through said tar, cooling the coated surface to below the melting point of said tar, spreading micro-crystalline wax over said coated surface, heating said surface to melt said wax, rubbing off the excess wax from said coated surface, adding additional particles of battery grade graphite to said coated surface, and heating said surface to disperse said additional particles through said coating.

No references cited.